Oct. 15, 1935.   A. THERIAULT   2,017,774
BRAKE EQUALIZER
Filed Feb. 27, 1934   3 Sheets-Sheet 1
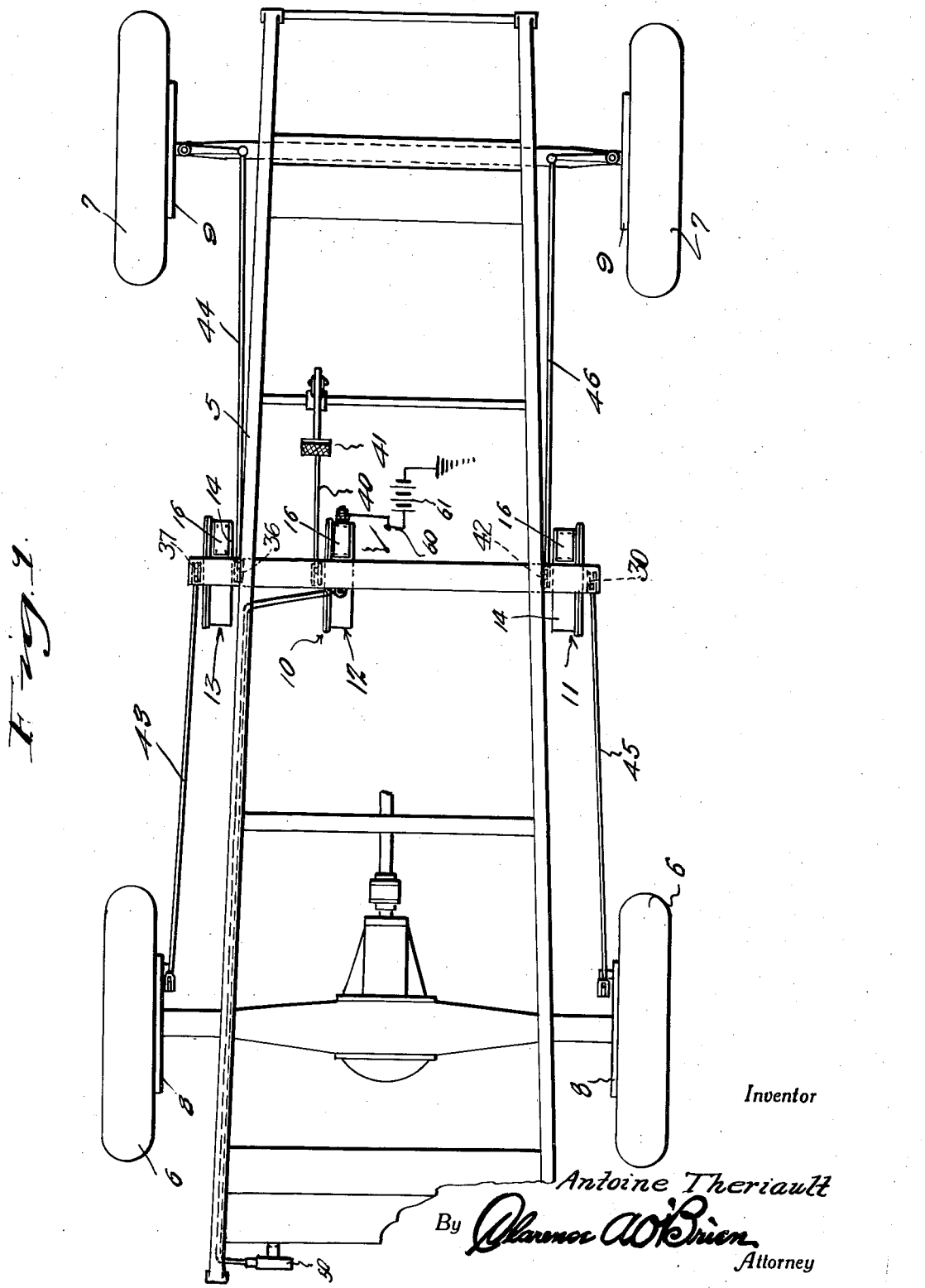
Inventor
Antoine Theriault
By Clarence A. O'Brien
Attorney

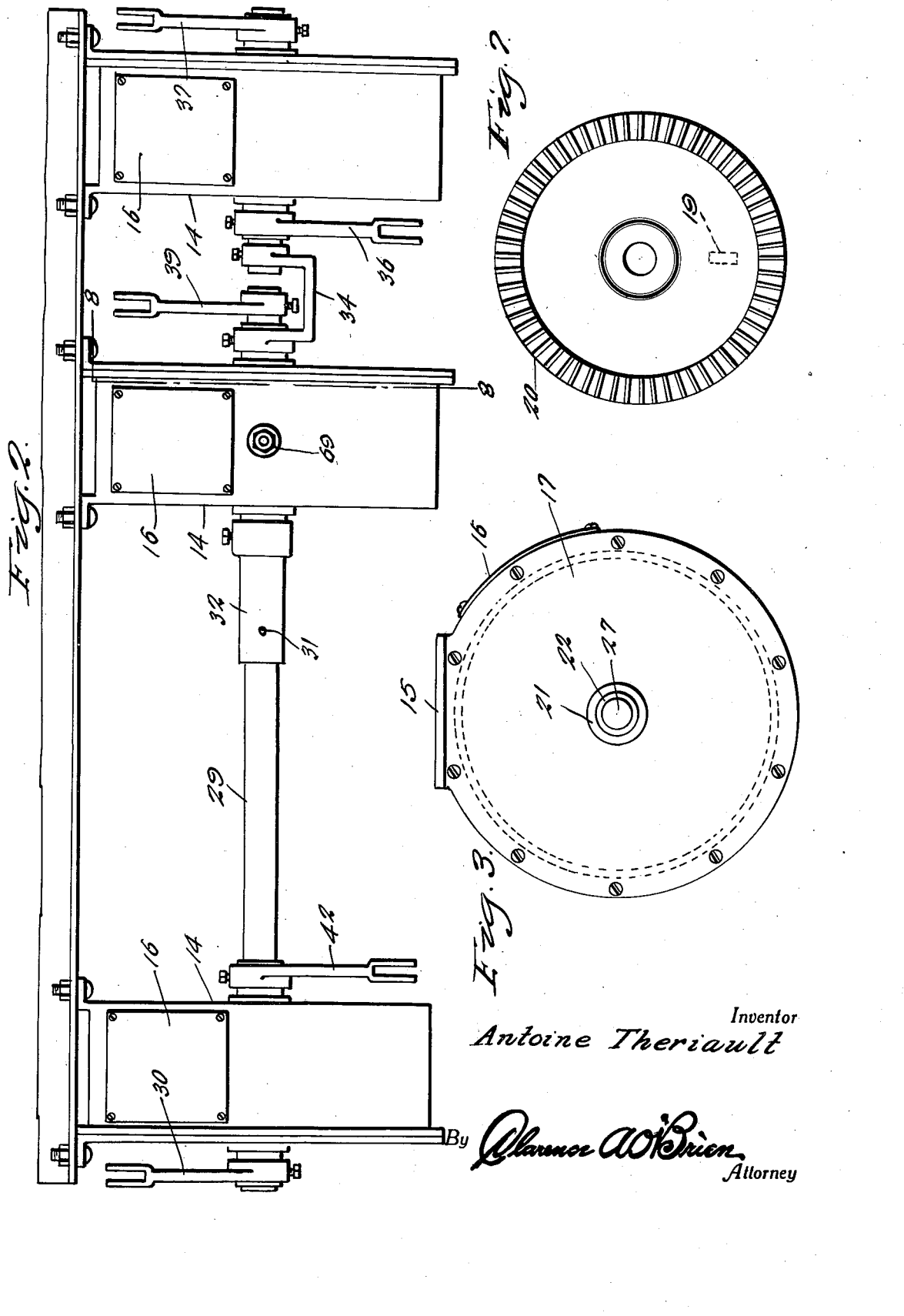

Oct. 15, 1935.  A. THERIAULT  2,017,774
BRAKE EQUALIZER
Filed Feb. 27, 1934  3 Sheets-Sheet 3
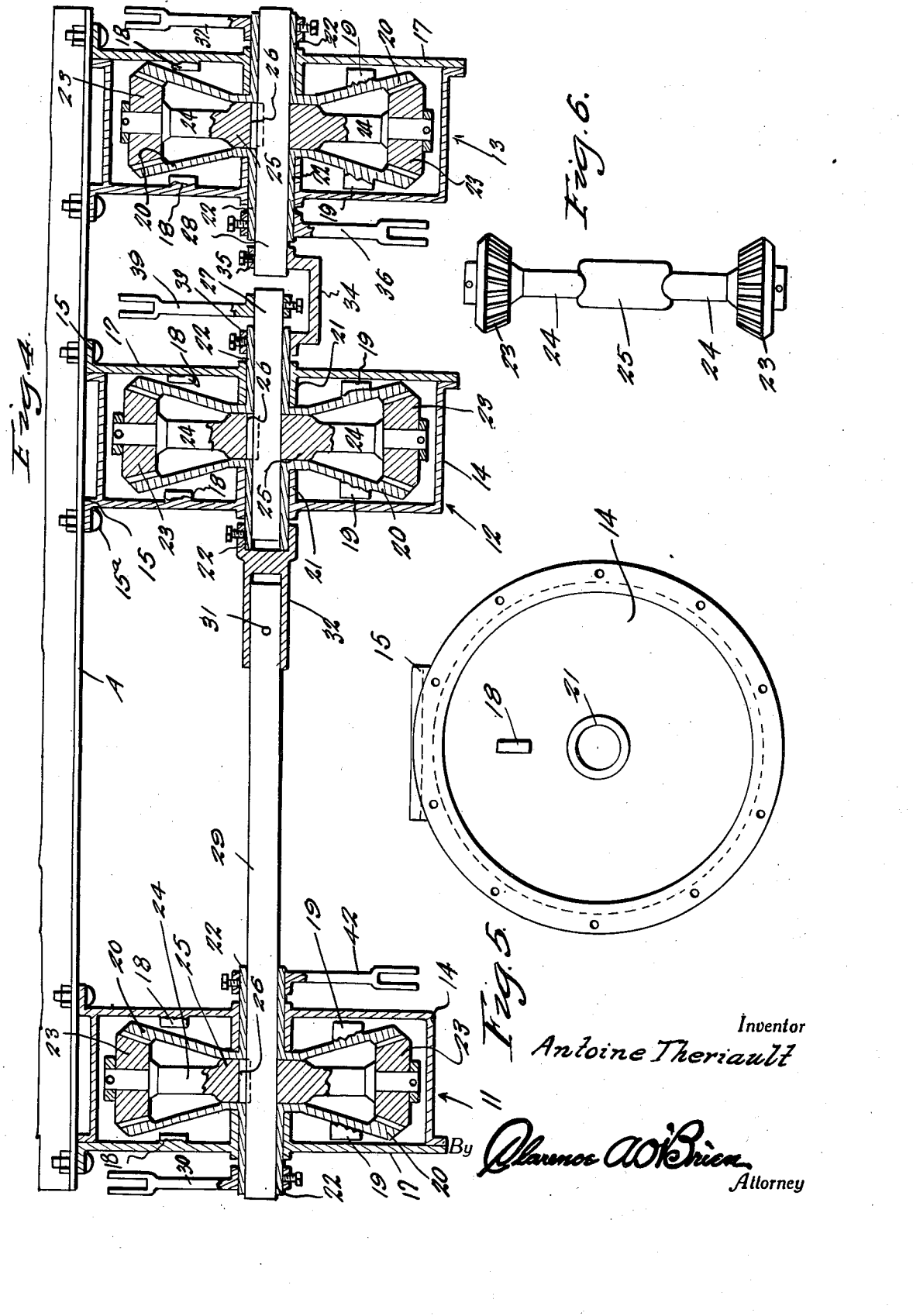
Inventor
Antoine Theriault
By Clarence A. O'Brien
Attorney Patented Oct. 15, 1935

2,017,774

UNITED STATES PATENT OFFICE 2,017,774

BRAKE EQUALIZER

Antoine Theriault, Nashua, N. H.

Application February 27, 1934, Serial No. 713,170

2 Claims. (Cl. 188—204)

This invention appertains to new and useful improvements in brakes, such as are employed on automobiles, and more particularly to an equalizing mechanism therefor.

This application is a continuation in part of my co-pending application, Serial No. 576,177, filed November 19, 1931.

The principal object of the present invention is to provide an equalizer for multiple brakes, preferably of the four-wheel type, wherein the parts are positive acting and not susceptible to the development of ready defects.

Another important object of the present invention is to provide an equalizer for automobile brakes wherein the gears are so constructed as to make the same substantially fool-proof in operation and in the event gears are stripped of their teeth or some other mishap occurs in the equalizer, some of the brakes will be caused to operate nevertheless.

Still another important object is to provide a brake control mechanism wherein switch means are mounted in a simple and convenient manner for controlling a stop light.

Other important objects and advantages of the invention will become apparent to the reader of the following specification.

In the drawings:—

Figure 1 represents a top plan view of the chassis of an automobile, showing the equalizer mounted in conjunction with the four-wheel brakes illustrated.

Figure 2 represents a front elevational view of the three units of the equalizer.

Figure 3 represents a side elevational view of one of the casings.

Figure 4 represents a longitudinal sectional view through the mechanism shown in Figure 2.

Figure 5 represents an inside elevational view of one of the casings.

Figure 6 represents a side elevational view of one of the pinion mounts, with its pinions thereon.

Figure 7 represents a side elevational view of one of the gears.

Referring to the drawings wherein like numerals designate like parts, it can be seen in Figure 1 that numeral 5 represents the chassis of an automobile, while numerals 6 represent the rear wheels, while numeral 7 represents the front wheels, the same being equipped with the rear and front brakes 8 and 9, respectively. Numeral 10 generally refers to the novel brake equalizer which includes three units generally referred to by numerals 11, 12 and 13. Numeral 12 represents the primary unit, while numerals 11 and 13 represent the secondary units. Each of the units includes a cylindrical housing 14 which is secured to the supporting bar A in a depending position by lugs 15 and bolts 15ª. Each of these housings 14 is provided with an opening on its forward side through which lubricant can be placed into the housing and this opening is normally closed by a removable plate 16.

Each unit includes a removable side closure plate 17, the upper, inner side thereof, as well as the opposed portion of the opposite wall of the casing, being provided with bosses 18 which will be in the path of corresponding lugs 19 on the frusto-conical shaped gear wheels 20. Thus stops are provided between the gears 20 and the housings so that some of the brakes can be operated even if one of the units does become defective.

Each of the units has a tubular bearing 21 centrally located on both the plate 17 and the opposed wall of the housing and through these are journaled the elongated bearing sleeves 22 of the gears 20. In each unit the gears 20 are provided with teeth on their opposed sides adjacent their peripheries meshing with beveled pinions 23—23 at the outer ends of the arms 24—24 projecting in opposite directions from a collar 25 which is keyed, as at 26, to the corresponding shaft, which in the case of the unit 12, is the shaft 27, and in the case of the unit 13, the shaft 28. Extending through the sleeves 22 of the gears in the unit 11 is the elongated shaft 29.

As is clearly shown in Figure 4, this shaft 29 extending through the sleeves 22 of the unit 11, has the arm 30 connected to the sleeves 22 adjacent the outer end of the shaft 29, while the inner end of the shaft is connected by the pin 31 to the coupling 32, the coupling 32 in turn being connected to the outer end of the adjacent gear sleeve 22 of the unit 12, while the other gear sleeve 22 has a collar 33 secured thereto and a U-member 34 connects this collar to the collar 35 on the adjacent end of the shaft 28 of the unit 13, while the adjacent gear sleeve 22 of the unit 13 has an arm 36. The other gear sleeve 22 of the unit 13 has an arm 37, while the end of the shaft 27 of the unit 12 adjacent the U-shaped connector 34 is equipped with the arm 39 which is connected by the rod 40 to the usual foot brake pedal 41 (see Figure 1). It will also be seen in Figure 4 that the inner gear sleeve 22 of the unit 11 is provided with the arm 42.

As is clearly shown in Figure 1, the arm 30 is connected by the rod 45 to the right rear brake 8, while the arm 42 of the same unit is connected by the rod 46 to the right front brake. The arm 37 of the unit 13 is connected by the rod 43 to the left rear brake, while the arm 36 of the unit 13 is connected by the rod 44 to the left front brake.

It can now be seen that the unit 12, which may be regarded as the primary unit, while the units 11—13 are the secondary units, actually serves to equalize action between the units 11—13.

It will also be observed that the gears 20 are of frusto-conical shape so that while the gear ratios are maintained, the axial portions converge in such a manner as to permit the bearing tubes 21 of the housing to extend an appreciable distance inwardly so that considerable bearing surface is afforded the gears.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. An equalizer for four wheel brakes comprising a primary differential unit, a pair of second differential units, each of said units including a shaft having a beveled gear thereon, a pair of sleeves on each of the shafts arranged one sleeve at each side of the beveled gear, a ring gear on the inner end of each of the sleeves meshing with said beveled gear, and an arm on the remaining ends of the sleeves of the secondary units for connection with front and rear brakes, a brake pedal connected arm on one end of the shaft of the primary unit, and driving connections between the remaining ends of the sleeves of the primary unit and the inner ends of the shaft of the secondary units.

2. An equalizer for four wheel brakes comprising a primary differential unit, a pair of second differential units, each of said units including a shaft having a beveled gear thereon, a pair of sleeves on each of the shafts arranged one sleeve at each side of the beveled gear, a ring gear on the inner end of each of the sleeves meshing with said beveled gear, and an arm on the remaining ends of the sleeves of the secondary units for connection with front and rear brakes, a brake pedal connected arm on one end of the shaft of the primary unit, driving connections between the remaining ends of the sleeves of the primary unit and the inner ends of the shaft of the secondary units, the connection between the primary unit sleeve end adjacent the said brake pedal connected arm being of U-shape to accommodate the said brake pedal control arm.

ANTOINE THERIAULT.